United States Patent [19]

Das

[11] Patent Number: 5,404,635
[45] Date of Patent: Apr. 11, 1995

[54] METHOD OF MAKING A NARROW TRACK THIN FILM HEAD

[75] Inventor: Shyam C. Das, Sudbury, Mass.

[73] Assignee: DAS Devices, Inc., Freemont, Calif.

[21] Appl. No.: 888,350

[22] Filed: May 21, 1992

[51] Int. Cl.⁶ .............................................. G11B 5/42
[52] U.S. Cl. ..................................... 29/603; 427/131; 427/132
[58] Field of Search ................. 29/603; 427/131, 132; 360/119–121, 125, 127

[56] References Cited

U.S. PATENT DOCUMENTS

| 4,695,351 | 9/1987 | Mallary | 204/15 |
| 4,839,197 | 6/1989 | Henderson | 29/603 X |
| 5,282,308 | 2/1994 | Chen et al. | 29/603 |

Primary Examiner—Carl E. Hall

[57] ABSTRACT

Process for fabricating a thin film head for high track density recording defines an easy axis parallel to the track in the narrow poletip without a need of a very high magnetic field in the plating cell. Narrow poletips of equal widths of P1 and P2 are obtained. The process includes sheet depositing a magnetic layer, then depositing a sheet of gap material, and then depositing a sheet of another magnetic layer. This operation can be done either by a vacuum technique or by an electroplating process. If it is done by vacuum processing, all the three depositions can be done in one pumpdown. Since the sheet magnetic films are deposited, the demagnetizing field is very small, and a small orienting field is necessary unlike the large field required in the prior art.

20 Claims, 7 Drawing Sheets

METHOD OF MAKING A NARROW TRACK THIN FILM HEAD

BACKGROUND OF THE INVENTION

1. Field of Invention

The present invention relates generally to magnetic data storage devices, and particularly to read/write heads for use in such devices. The invention particularly teaches new method and apparatus for a new thin film head for high density magnetic disk drives for use in computer data storage.

2. Description of the Prior Art

A read/write head is used to record and store information on a rotating magnetic disk or magnetic tape, and also to read back the stored information. A typical mass storage devices store information on spinning magnetic disks, the information being recorded in the form of transitions in magnetic flux on the magnetic surface of the disk. In particular, the data is recorded in a plurality of tracks, with each track being a selected radial distance from the center of the disk. The number of transitions per inch along the track defines the bits per inch (BPI), and the number of tracks per inch along the radial distance defines the tracks per inch (TPI). The product of the BPI and the TPI defines the areal density stored in the magnetic film on the disk. A read/write head flies in close proximity to the disk surface and is held in approximate radial position over the disk by an arm. Under the control of the system's processor unit the arm can move the read/write head to the appropriate track in which the data is recorded so that it may be read, or into which data is to be written.

A commonly used inductive read/write head comprises two pole pieces formed from a magnetic material and a write coil. At one end, the pole pieces are touching and at the other end there is a slight gap between the pole pieces. The head is positioned so that the gap is directed towards the disk surface. When electric current is impressed on the coil, a magnetic flux is generated, which is impressed upon the pole pieces. The width of the poles along the track direction corresponds to the width of the track in which information is recorded. The smaller the pole width, the narrower is the track, thereby increasing TPI, which is the trend of the future in high density recording.

At the gap, the magnetic flux is directed through the magnetic material in the adjacent disk surface to thereby impress magnetic flux therein. A thinner gap head writes narrower transitions, thereby increasing BPI. Higher BPI and higher TPI increases areal density, thereby increasing information storage in the disk surface. This higher storage density is very desirable for the miniaturized disk drives with high information storage capacity, needed for the popular computers, e.g., PCs, workstations, laptops, notebooks, and the like.

When data is being written onto a disk, the write coil is energized with a varying current pattern which corresponds to the data to be written. The varying current results in the generation of the corresponding pattern in the magnetic flux which the head applies to the surface of the rotating disk. Since the disk moves relative to the head, the magnetic flux on the disk surface also varies along the length of the arc traversed by the head on the disk.

When the data is read, the head flies over the arc of the disk surface in which the data was written. A small amount of flux from the disk permeates mostly into the poles of the head. The flux in the head varies in response to the pattern of flux recorded on the disk. The varying flux results in the generation of varying voltage in the coil, which, in turn, is sensed as the previously-recorded data.

In a known process for making thin film heads, an insulating base layer of, for example Al2O3, is deposited on a substrate. Because this base layer is insulating, a sputtered seed layer of a material such as NiFe is applied to the base layer. Photoresist is then spun over the seed layer and a pole piece pattern is then formed by photolithographic techniques. U.S. Pat. No. 4,900,650 discloses a pole piece pattern in which the narrower poletip (defining the trackwidth) is connected to a bigger pole structure (the "bulb"), and NiFe film is deposited everywhere, except a 10 to 15 micron band surrounding the pole piece geometry, by through-mask electroplating. This approximates to a sheet plated NiFe film which has better uniformity and control of NiFe composition and thickness as compared to polepiece geometry without the bulb. Because the neck region in the pole tip is narrow, this pole piece has properties inferior to those of a pole piece formed from a sheet plated NiFe film. For higher TPI heads the poletip width has to be narrower than 6 microns. As the poletip becomes narrower, the effect of this inferiority becomes greater.

The existing art of fabricating magnetic pole pieces of a thin film head includes a through-mask plating process. U.S. Pat. No. 4,695,351 discloses that a through-mask plated pole with a poletip in the range of 5 to 10 microns requires an orienting field of at least 5000 Gauss. In order to define the same easy-axis everywhere in the magnetic film, the magnetic field is required to be only high in magnitude but also uniform in direction, particularly in the volume where potentially functional devices have to be plated. The need of high magnitude (5000 Gauss) and uniformity in direction of magnetic field requires a large magnet in the plating cell. This makes the plating cell very bulky, inconvenient and expensive. Even with this, not too large an area can be plated with uniformly defined easy-axis film, because the complexity and expense increases multifold with the increase in the volume, where the field has to be large and uniform in direction. This limits the size of the wafer and the number of the wafers to be plated at a time, correspondingly restricting the manufacturing throughput. Furthermore, heads produced by through-mask plating have variations in readback signal amplitude and in the readback pulse shape due to undesirable magnetic domains in the formed head.

Besides the magnetics problem discussed above, there is another problem in fabrication of a narrow track thin film head. A typical thin film head is fabricated by through-mask plating of the first magnetic pole (P1) on a previously sputtered seed layer for plating. After plating, the seed layer is removed by sputter etching from the moat area surrounding the pole geometry, the pole geometry is protected by photoresist via a photolithographic process and current thieve areas are chemically etched away, and the photoresist protection is removed by dissolving the photoresist in a solvent. This defines the NiFe magnetic pole piece P1, while the second magnetic pole piece (P2) is formed later. Then a 0.3 to 0.6 micron thick alumina layer is formed on P1 to define the read/write gap. Alumina in the back closure area (away from the poletip area) is then etched away via photolithography and chemical etching processes, to enable contact between the P1 and P2 pole when the P2 pole is formed. Copper coils (C), separated by a hard-baked photoresist polymer layer, are then deposited along with the bonding pads. The coils and the adjacent layer of the P2 pole are separated by the hard-baked photoresist layer. This builds a high topography over which P2 must be aligned over the bottom pole (P1). The second magnetic pole (P2) is then deposited on the then built structure via a through-mask plating process in the same manner as the pole P1 was defined. Ideally, the poletip of P1 and the poletip of P2 are of the same dimension and are accurately aligned one over the other, but in practice, this is not possible due to photolithographic limitations and the high topography. Therefore, in a practical thin film head, the pole width for P1 in the poletip region is made wider than the poletip width of P2. In thin film heads, the P1 poletip is made about 1.5 to 2 microns wider than the P2 poletip so that the P2 poletip can be accurately defined within the P1 poletip width. The trackwidth of such heads is not defined by the P2 poletip width but is a compromise between the P1 poletip width and the P2 poletip width.

As track width becomes narrower, as is the case in the present and the future trend of the high density magnetic recording, the offset between the P1 and P2 poletip widths, e.g., about 2 microns, makes a severe compromise in the performance of the head. One approach of making such a narrow track head is first to complete the processing steps up to forming of P2 pole. The P1 poletip width can be much larger than the P2 poletip width. In this approach, the trackwidth is defined by photo patterning the tip region and ion-beam etching the unprotected poletip region. This has been discussed by T. Nakanishi al in the IEEE Trans. Magn., MAG-15, pp-1060. Even in this approach, however, the consistent definition and alignment of the narrow track poletip is a problem in view of the limitations in exposing the thick photoresist formed in the poletip region arising from the high topography of the head.

It is an object of the present invention to provide a new and improved technique for fabricating a thin film head for high track density recording.

It is another object of the present invention to provide a technique for manufacture of a thin film head defining an easy axis parallel to the track in the narrow poletip without a need of a very high magnetic field in the plating cell.

It is another object of the present invention to provide a technique for defining narrow poletips of equal widths of P1 and P2.

SUMMARY OF THE INVENTION

These and other objects are well met by the present invention in which a new and improved technique for fabricating a thin film head for high track density recording is disclosed. This solves two major problems in fabrication of a high track density head. One is related to defining an easy axis parallel to the track in the narrow poletip without a need of a very high magnetic field in the plating cell. Another is related to defining narrow poletips of equal widths of P1 and P2.

The invention includes sheet depositing a magnetic layer, then depositing a sheet of gap material, e.g.,alumina, and then depositing a sheet of another magnetic layer. This operation can be done either by a vacuum technique or by an electroplating process. If it is done by vacuum processing, all the three depositions can be done in one pumpdown. Since the sheet magnetic films are deposited, the demagnetizing field is very small, and a small orienting field is necessary unlike the large field required in the prior art.

In this invention, only a few times the anisotropy field is necessary for an orienting field in the magnetic film deposition system. This is very easy to produce even in a large volume, thus allowing production of larger wafers, or more wafers at a time, during magnetic film deposition. This increases manufacturing throughput substantially. If the magnetic film is deposited by the plating process, the sheet plated film has uniform composition and thickness of the magnetic alloy across the wafer and high consistency from wafer to wafer. If the sheet film delaminates due to internal stress, large patterned structures may be deposited such that composition and thickness across the wafer are uniform and the energization field is small.

The pole geometry may be defined by photo patterning and etching processes. A preferable etching process is anisotropic directional etching, e.g., reactive or non-reactive ion-beam etching, electro-chemical etching, or chemical or nonchemical laser etching.

The pole geometry may also be defined by conventional chemical etching process, wherein undercutting due to its isotropic etching nature may be minimized by oversizing the geometry and etching for a specified time. The chemical etching may be in sequence of first etching the magnetic film with its etchant, then etching the gap material (e.g., alumina) with its etchant, then again etching the magnetic film with its etchant. The gap material under the top magnetic layer acts as an etch-stop layer, while the bottom magnetic layer acts as an etch-stop layer for the gap layer material, and the base layer material acts as an etch-stop layer for the bottom magnetic layer, in sequence. This defines the pole geometry including the poletips of the poles P1 and P2. Because of the planar topography, this definition is very accurate as compared to the nonplanar topography in the prior art. Pole widths in the poletip region of P1 and P2 are essentially equal, as is desired for a narrow track recording head. The masking material for defining the pole geometry may be non-metallic (e.g., photoresist, SiO, SiO2, Al2O3) or metallic (e.g., Ta or Ti).

The yoke region (where the pole geometry starts expanding from the narrow neck) is etched away by photolithography, ion-beam etching and/or chemical etching techniques. This leaves the poletip region defining the trackwidth accurately. Now the hardbaked insulation layer (which may define the zero throat position), coil layers, another insulation, and the yoke region of P2 joining with the P2 poletip are sequentially formed.

In one embodiment, the narrow neck of P1 extends beyond the zero throat away from the air bearing surface of the head, while the P2 neck does not extend beyond the zero throat. This invention is also applicable to fabrication of future high density magnetoresistive heads.

BRIEF DESCRIPTION OF THE DRAWINGS

The above and further advantages of this invention may be better understood by referring to the following description taken in conjunction with the accompanying drawing in which.

DETAILED DESCRIPTION OF AN ILLUSTRATIVE EMBODIMENT

Figure 1A:
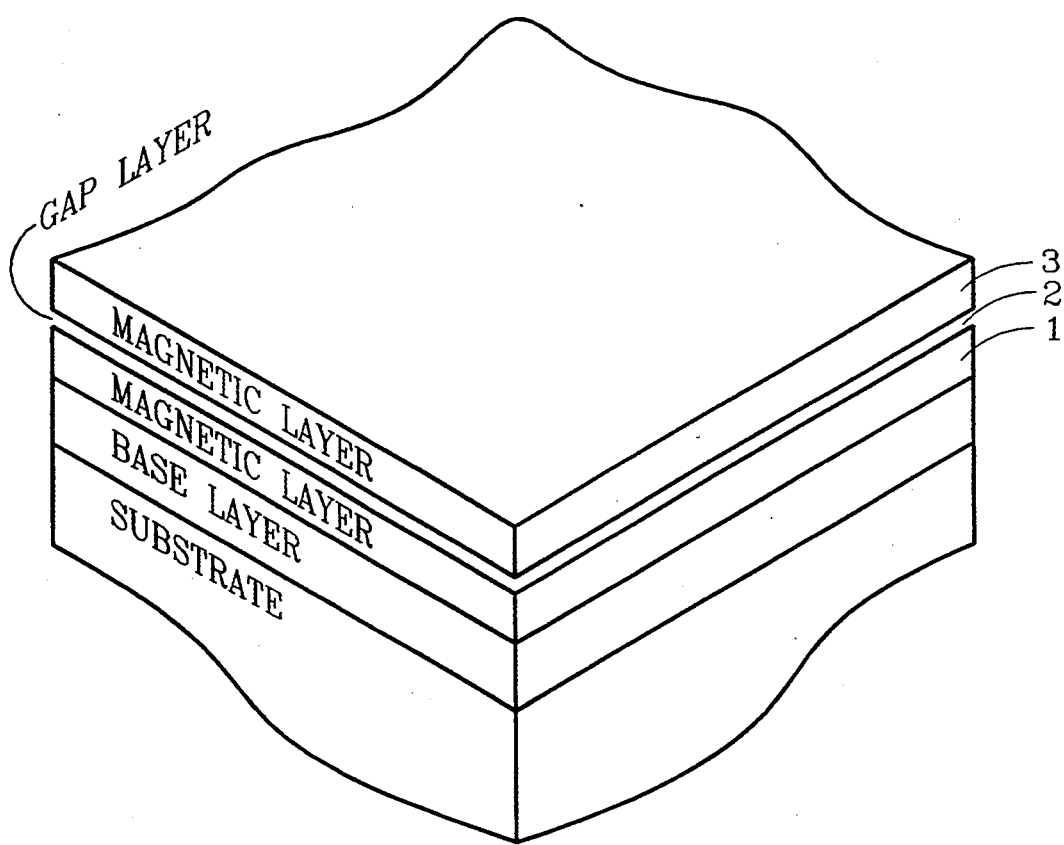
FIG. 1A depicts the layer sequence in the sheet deposition process of this invention.
Figure 1B:
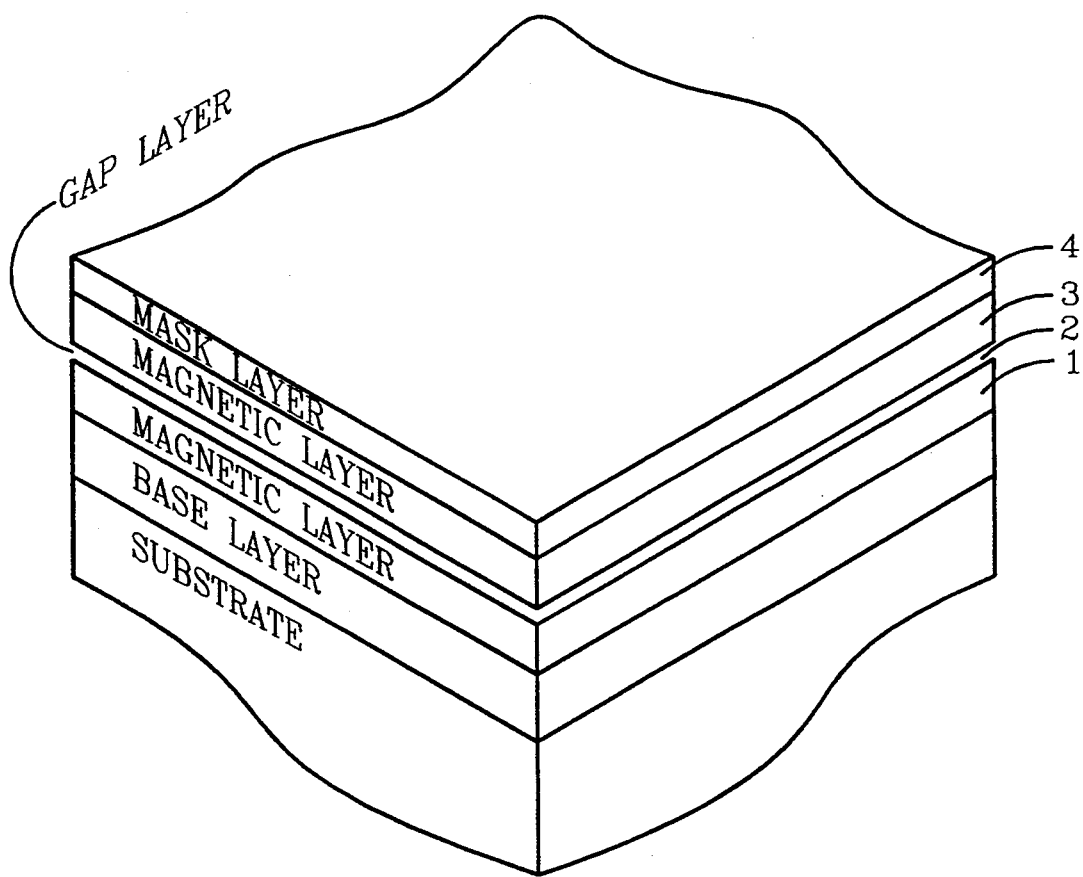
FIG. 1B is an alternative sequence of layers in the sheet deposition process, Where layer 4 (metallic or non-metallic) could be used to define a mask for the subsequent etching process.

Referring to the drawing, FIGS. 1A and 1B depict the layer sequence of a pole geometry 10 of a thin film head. If an electroplating process is used to deposit the magnetic layers, e.g., NiFe, then a seed layer of NiFe is sputter deposited on an adhesion promoting layer, e.g., Ti, W, Ta, and Cr, on the baselayer of the substrate. Then an NiFe film of an appropriate thickness required for saturation writing of the media is sheet electroplated. Current density is uniform across the wafer when plated in the sheet form, resulting in uniform thickness and composition of Ni and Fe across the wafer. This composition and thickness will be the same in the poletip region 5 and the yoke region 7. Accordingly, the domain pattern in the narrow neck region 5 allows propagation of magnetic flux by coherent rotation. This is required for a large and undistorted readback signal. In contrast, the prior art of through-mask plating produces variations in thickness and composition of Ni and Fe in the poletip and in the yoke region.

The sheet deposited film requires a very small orienting field to define the easy axis in the film. For example, if the anisotropy field of the film is 50 Oe., then less than 20 Oe. orienting field is sufficient to define the easy axis in the film. Such a small field can be easily produced even in a large volume whether it is a plating cell or a vacuum deposition system.

The material in the layer 2 defining the read/write gap, e.g. alumina, is then sputter deposited (of the desired thickness) in sheet form. A NiPe seed layer (perhaps over an adhesion layer of Cr, Ti, or the like) is then sputter deposited on it. Then again, a sheet magnetic layer 3, e.g., NiPe, is plated thereover of appropriate thickness for the desired read/write performance of the head.

Alternatively, the layer sequence shown in either in FIG. 1A or 1B, may be deposited by vacuum process in one pumpdown. Whether they should be deposited by vacuum or by plating depends on cost of producing the parts. The vacuum technique has the advantage that the magnetic sheet films may even be high saturation and high permeability materials, e.g. CoZr alloy, iron nitride, etc. Also, these films may be laminated to improve high frequency performance. Alternatively, materials may be deposited in large patterns (instead of in sheets) to minimize stress effects. The patterns may be deposited sequentially in separate steps.

Figure 2:
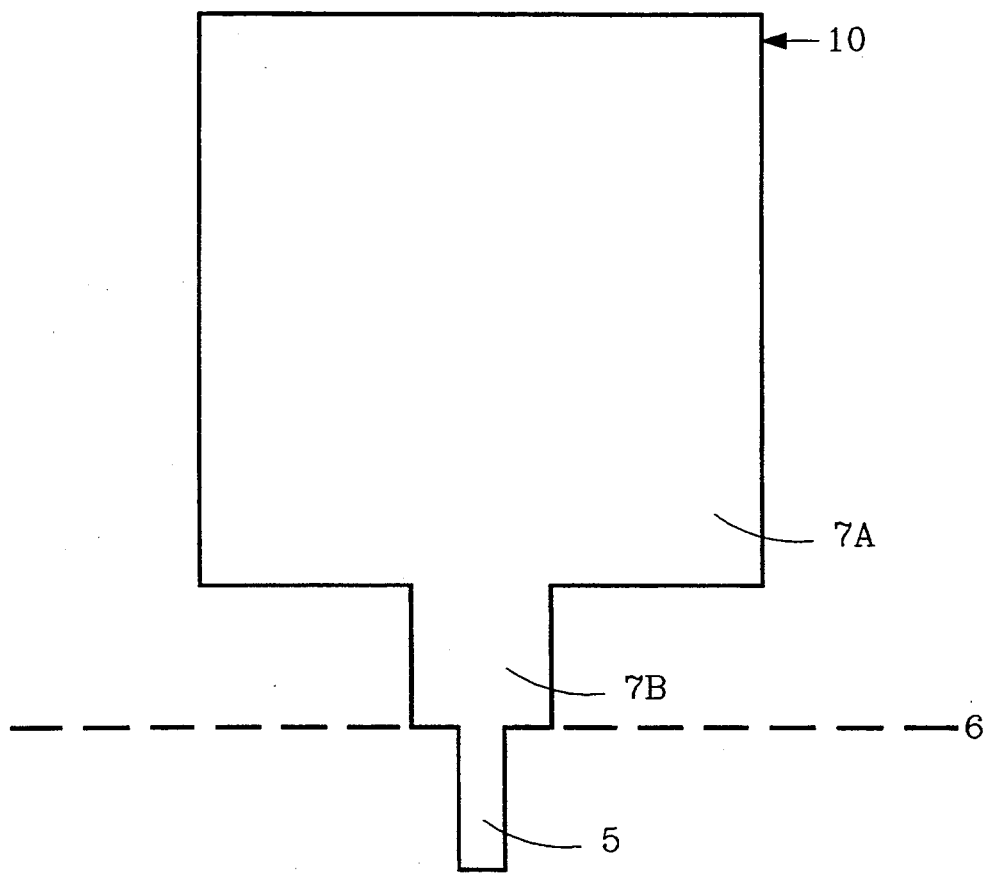
FIG. 2 is a schematic of the mask to form the pole geometry 8 by etching process from the sandwich of the sheets in FIG. 1.

After a multilayer structure corresponding to FIG. 1A or 1B is deposited, a polepiece mask shown in FIG. 2 may be used to define the pole geometry 10. Alternatively, another masking layer 4, e.g., alumina, may further be deposited in sheet form, as shown in cross-section in FIG. 1B. In either case, photoresist is spun and a pole geometry mask shown in FIG. 2 is formed. Only the pole geometry 10 is protected by the photoresist. This geometry is imprinted in the multilayer sheets shown in FIG. 1 by etching techniques.

Chemical etching, begins with etching of the magnetic film with its etchant, then etching alumina with its etchant, then again etching the magnetic film with its etchant. Alumina under the top magnetic layer acts as an etch-stop layer, the bottom magnetic layer acts as an etch-stop layer for the gap layer alumina, and the base layer alumina acts as an etch-stop layer for the bottom magnetic layer, in sequence. This defines the pole geometry including the poletips of the poles P1 and P2. Because of the planar topography, this definition is very accurate as compared to the nonplanar topography in the prior art. Pole widths in the poletip region of P1 and P2 are essentially equal as is desired for a narrow track recording head.

A preferable etching process is anisotropic directional etching, e.g., reactive or non-reactive ion-beam etching, electro-chemical etching, chemical or non-chemical laser etching or any other anisotropic directional etching process. The pole geometry may also be defined by a conventional chemical etching process, where undercutting due to its isotropic etching nature may be minimized by oversizing the geometry and etching for a specified time.

As an example, if the etching is performed by an ion-beam technique, the multilayer structure of FIG. 1B may be more desirable. This is because, alumina or tantalum, for example, etches much slower than the magnetic film, e.g., NiFe. If the masking layer is the same as the gap material, then the masking layer 4 should be thicker than the gap layer 2 so that the combined mask of photoresist and layer 4 allows complete etching of the layer 1. Photoresist may get charred in the ion-beam etching process, if not careful. In that case only an alumina mask may be used. Alternatively, a combination of ion-beam etching and chemical etching may be used.

After defining the photomask corresponding to a pole geometry 10, the layer 4 may be etched by chemical process using alumina etchant, or reactive ion-etching if the masking material is tantalum, for example. The etching action will stop when the magnetic sheet 3 is exposed completely. Using this mask the pole geometry may be defined by ion-beam etching. Etching may be allowed all the way to etch layer 1, or exposing only up to layer 2. In one approach the etching could be done up to layer 2, and photoresist mask is removed. Then alumina mask (layer 4) and alumina from layer 2 in the regions other than the pole geometry is etched away using alumina etchant.

Imprint of the pole geometry on layer 1 could be made by ion etching further. In this case the pole geometry on the layer 3 (or metallic mask, e.g., tantalum) acts as the mask for the layer 1. In order that P2 poletip width is of the desired thickness after completion of ion milling of layer 1, the initial minimum thickness of layer 3 has to be the desired pole thickness of P2 plus thickness of P1 if P2 is used as a mask for etching P1.

The layer 4 may be a different material than the gap material layer 2. The only requirement of layer 4 is that it should etch much slower than the magnetic layers 3 or 1 during an ion beam etching process, and that the chemical etchant of the layer 4 material negligibly attacks materials in the layers 3, 2 or 1. One such material could be Ti, Ta, Cr, and the like. In this approach, first a photomask of a pole geometry 10 is formed, and the layer 4 material is etched chemically or by reactive ion process. This forms the .mask for subsequent etching. The photomask as well as the mask formed in the layer 4 together could be used for ion-beam etching to form the pole geometry in the layers 3, 2 and 1. The use of the mask layer 4 will allow ion-beam etching through layer 1 without necessity of unusually thick photo mask. After etching all the way through layer 1, the photomask (if any is remaining) will be stripped off and the mask on the layer 4 is removed by chemical or reactive ion etching.

Figure 3:
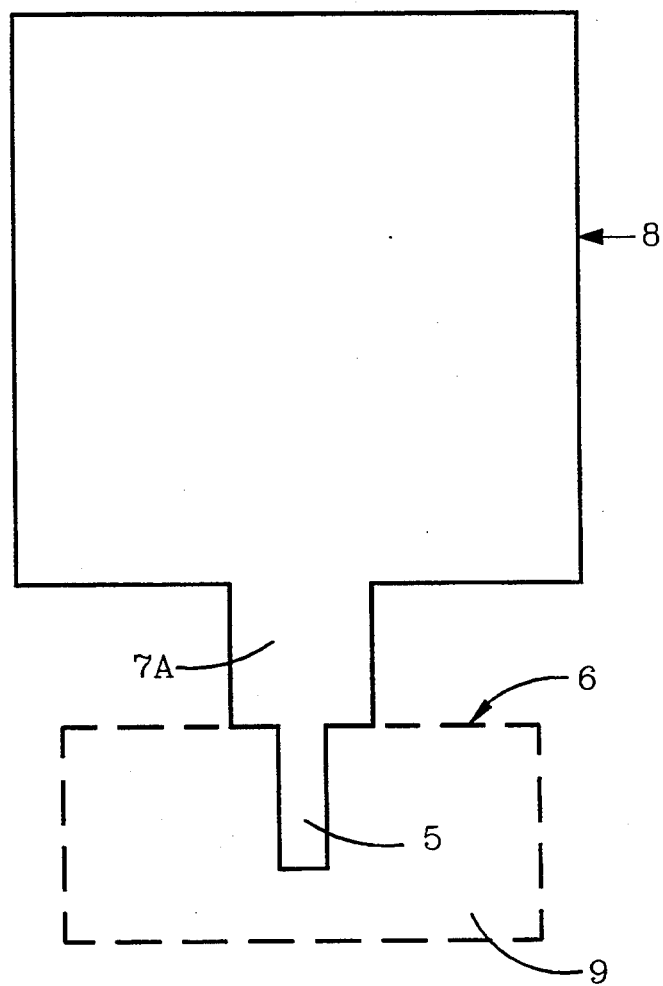
FIG. 3 is a schematic of the mask 9 protecting the poletip 5 while etching the yoke 7 from the layer 3.
Figure 4:
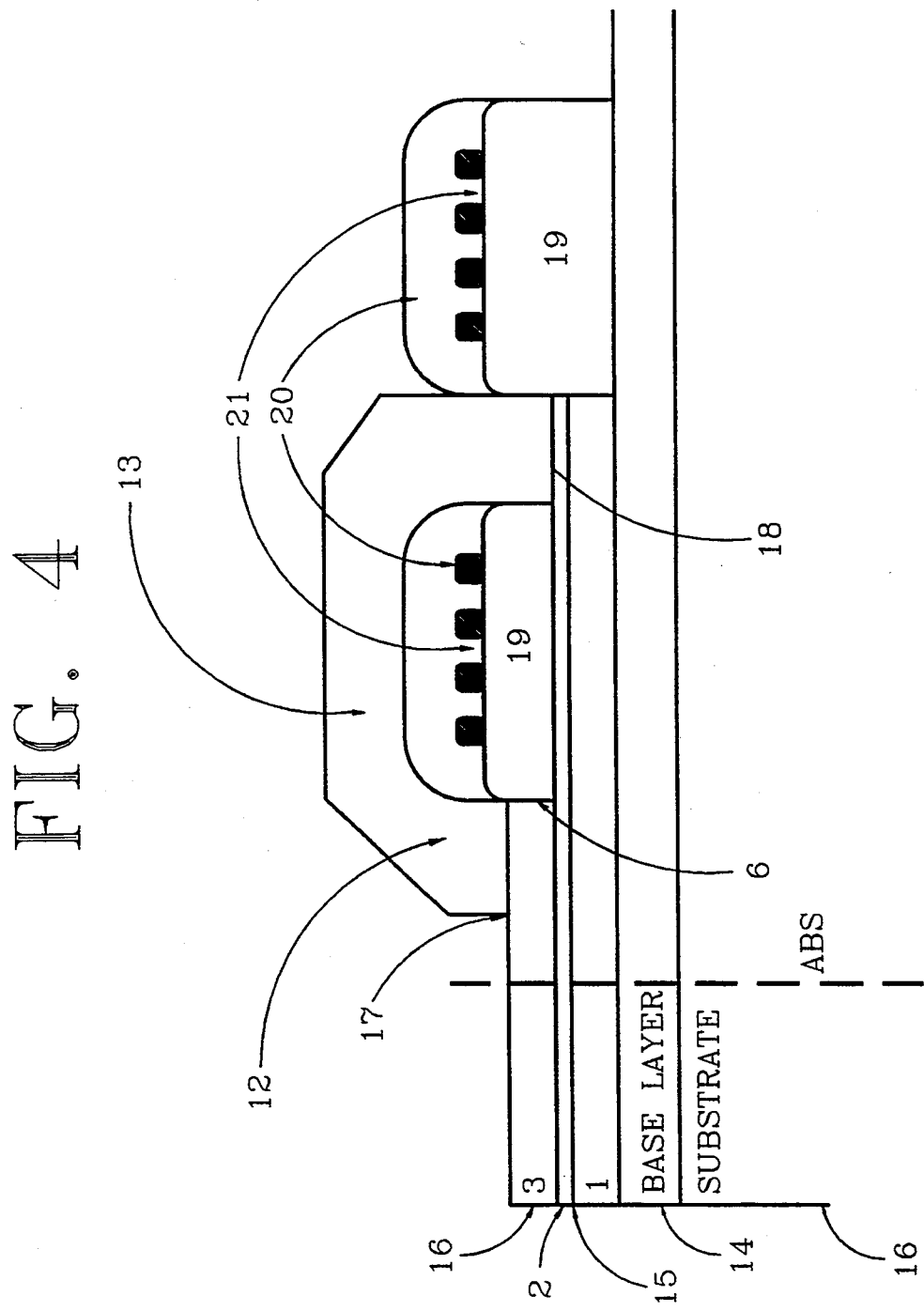
FIG. 4 is a cross-sectional schematic of a thin film head in accordance with the invention.

The above process has formed a pole piece geometry 10 (see FIG. 2) in the layers 3, 2 and 1 (see FIG. 4). The magnetic material of the layer 3 in the shape of the pole geometry is now completely exposed. Now, the yoke section (beginning at the end 6 of pole tip 5) in layer 3 has to be removed to make a complete read/write head. FIG. 3 shows such an overlay. The photomask 9 protects the poletip 5 up to its end 6 from where the yoke 7 starts fanning.

A chemical or anisotropic directional etching process may be used to remove the yoke sect ions 7 (A & B) and 8 (beyond the pole tip end 6). The etching stops automatically at stop layer 2. The photomask 9 is then removed. This leaves accurately aligned poletips 5 of P1 and P2, well defined gap thickness of layer 2, and a full shape of the pole P1. In contrast, the gap layer 2 in the prior art is exposed to subsequent processes which depletes the gap thickness and makes variable gap size from run to run. This affects manufacturing yields.

FIG. 4 is a schematic cross-sectional view of a thin film head fabricated in accordance with the present invention. After the poletips 5 for poles P1 and P2 are formed, the subsequent processing steps for the hard-baked photoresist insulation layer 19, the coil layer 20, and the next hardbaked photoresist insulation layer 21, are sequentially deposited in the manner of conventional thin film head fabrication processing. This process requires care in the alignment of the first insulation layer so that it begins from the inner end 6 of the P2 poletip, defining the interior of the zero throat of this head.

Figure 5:
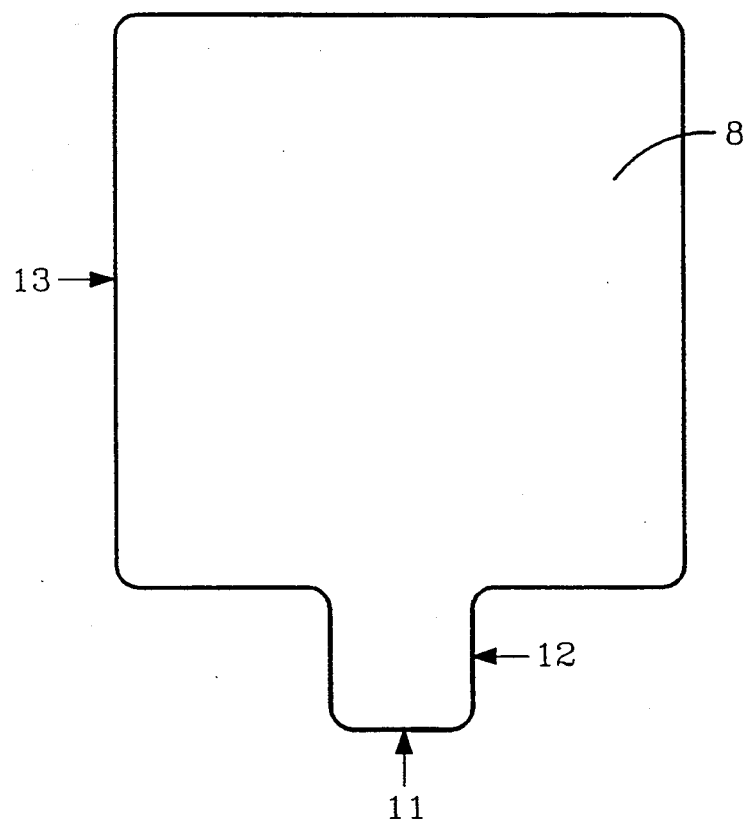
FIG. 5 is a schematic of the mask defining the yoke section of the pole P2.

A schematic of the yoke 13 of P2 is shown in FIG. 5. In this, the apex point 11 may be forward as much as the P2 thickness and slope in the pole tip region is desired, producing the outer part of throat 17. The yoke forward region 12 may be narrower than the yoke back region 8 to reduce the leakage of flux from P2 to P1. The yoke regions 8 or 12 are made wide enough that the demagnetizing field is not too large that through-mask plating of yoke 13 does not require very large field in the plating cell to define the desirable easy-axis in the yoke.

Figure 6:
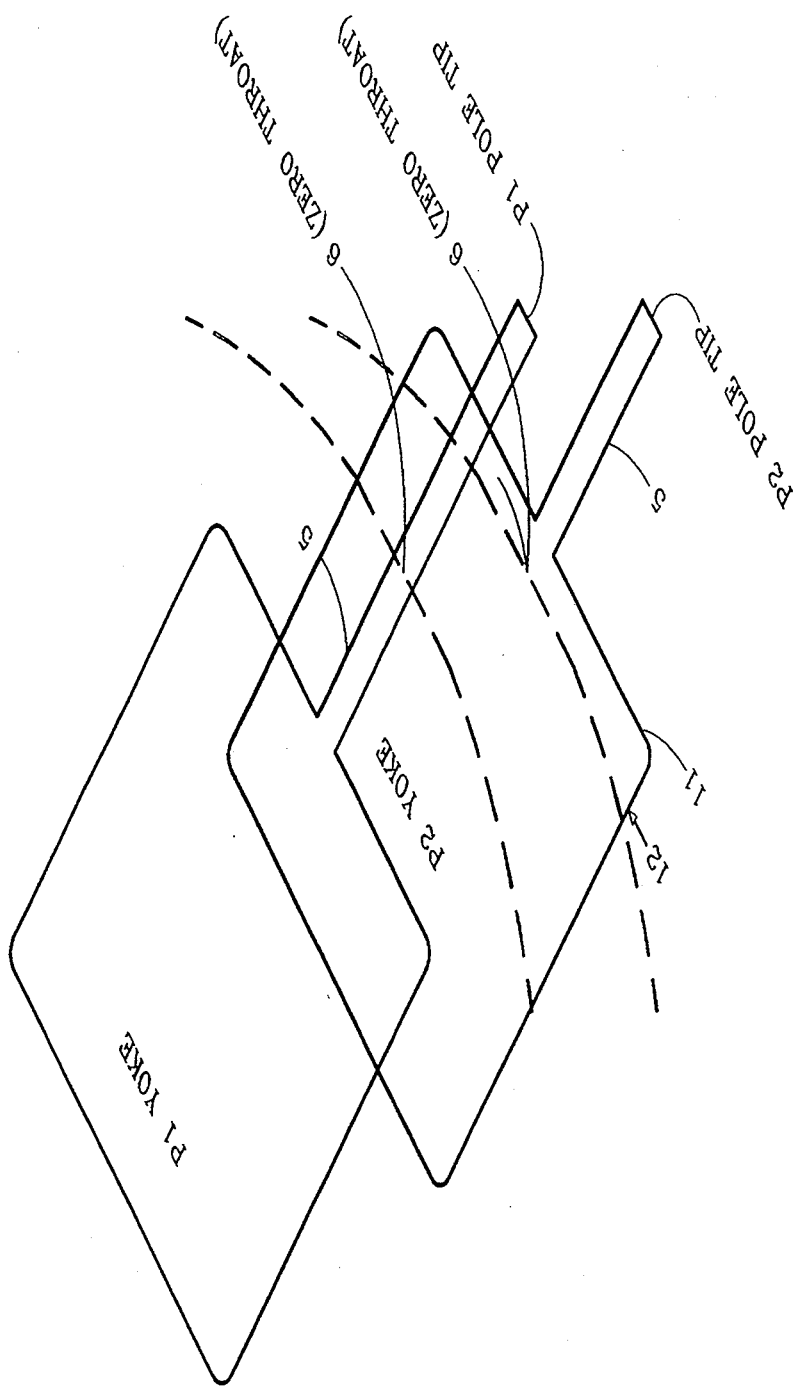
FIG. 6 is a schematic diagram showing the narrow neck of P1 extending away from the air bearing surface beyond the zero throat point, while the P2 neck does not extend beyond the zero throat.

To minimize the effect of misalignment, the narrow neck in the P1 pole extends beyond the zero throat away from the air bearing surface of the head. The narrow neck in the P2 preferably does not extend beyond the zero throat point. This is shown in FIG. 6. The wider yoke region 12 in P2 minimizes the demagnetizing field thus requiring a smaller orienting magnetic field to define the easy axis during plating even if the P2 yoke is plated via through-mask plating technique. The wider yoke region 12 behind apex 11 overlaps with the narrower neck 5 of P1 and minimizes the flux leakage between P1 and P2. The poletips of the completed head are lapped back to define the air bearing surface (ABS), with the active pole tips defined from the ABS to the zero throat.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the spirit and scope of the invention.

What is claimed is:

1. A method for making a transducing head for use in a magnetic storage device in a digital data processing system, the head for writing and/or reading data in the form of magnetic flux onto or from a magnetic media which moves relative to the head, the head having a pole structure including at least a leading pole P1 and a trailing pole P2, each with a yoke portion which tapers to a poletip, the poletips being separated by a nonmagnetic gap layer, an energizable flux source situated between the poles in the region where the yoke portion Is located for generating magnetic flux and including a sensor for producing voltage from the media flux which links through the pole tips to the sensor, the method comprising the steps of:

A. depositing sequentially a magnetic layer, a gap layer, and a second magnetic layer on a substrate, B. defining and forming said pole structure on the workpiece of step A, including forming at least a top magnetic layer in which the P2 pole is formed, C. protecting the poletips with a protection layer, and removing at least part of the yoke portion of the P2 pole in the top magnetic layer, and D. building insulation layers, coil layers and the yoke of said top magnetic pole P2 on the workpiece of step C, with the P2 yoke in magnetic contact with the P2 poletip and further providing a back via through which the P2 yoke couples to said yoke portion of said P1 pole, for forming of a magnetic circuit for interaction of the flux and media.

2. The method of claim 1 further comprising the step of forming an essentially planar topography at least in the areas to be patterned in step B.

3. The method of claim 1 further comprising the step of forming the deposited magnetic layers larger in dimension than the desired final dimension of the P2 poletip.

4. The method of claim 3 wherein defining and forming said pole structure on the workpiece of Step A, including forming at least a top magnetic layer in which the P2 pole is formed, includes the steps of:

BA. depositing a masking layer on the workpiece of step A,

BB. photo-patterning the deposited masking layer of step BA,

BC. etching the patterned masking layer of step BB to form an etch-mask,

BD. etching the workpiece of step BC to form the pole structure, and

BE. removing the masking layer remaining after step BD.

5. The method of claim 4 further comprising the step of forming said P1 and P2 poletips with essentially planar topography.

6. The method of claim 4 further comprising the step of using a non-metallic masking layer.

7. The method of claim 1 further comprising the step of forming said magnetic layers of high saturation and high permeability materials including the group comprising Co, Zr, or iron nitride.

8. The method of claim 1 further comprising the step of laminating at least one of the magnetic layers.

9. The method of claim 4 further comprising the step of etching directionally and anisotropically with minimal undercutting.

10. The method of claim 4 further comprising the step of using ion-beam etching for the etching process.

11. The method of claim 4 further comprising the step of using a surface of the workpiece formed in step A as an etch-stopping layer for chemical or reactive etching during step BC.

12. The method of claim 4 further comprising the step of electrochemical etching or reactive ion etching the P2 pole.

13. The method of claim 4 wherein said etching comprises the steps of chemical etching and wherein said etching includes using an oversized etch-mask to minimizing undercutting.

14. The method of claim 1 wherein step A further comprises the step of depositing a masking layer on the top of the second magnetic layer.

15. The method of claim 14 further comprising the step of using the same material for the masking layer as for forming the gap layer.

16. The method of claim 14 further comprising the step of using an etch rate for etching the masking layer which is lower than the rate of etching of the second magnetic layer, whereby reactive etching of the masking layer negligibly affects the second magnetic layer underneath the masking layer.

17. The method of claim 14 further comprising the step of selecting the masking layer from the group consisting of Cr, Ti, and Ta.

18. The method of claim 1 wherein the poletips are disposed to be exposed for forming of an air bearing surface, further comprising the step of forming a zero throat point between the inner end of the P2 pole tip and the outer part of the P2 pole where it meets the P2 pole tip, and further comprising the step of forming a narrow neck of the P1 pole extending beyond the zero throat point away from the tips of the pole at the air bearing surface.

19. The method of claim 1 further comprising the step of forming at least one of the poletips out of sheet magnetic film.

20. The method of claim 4 wherein step BD further comprises the step in which at least one of the poletips is at least partially etched.

* * * * *